United States Patent
Zeng

(10) Patent No.: US 12,279,722 B1
(45) Date of Patent: Apr. 22, 2025

(54) STIRRING DEVICE

(71) Applicant: Xiang Zeng, Guangdong (CN)

(72) Inventor: Xiang Zeng, Guangdong (CN)

( * ) Notice: Subject to any disclaimer, the term of this patent is extended or adjusted under 35 U.S.C. 154(b) by 0 days.

(21) Appl. No.: 18/945,834

(22) Filed: Nov. 13, 2024

(51) Int. Cl.
*A47J 47/16* (2006.01)
*A47J 43/10* (2006.01)

(52) U.S. Cl.
CPC ............... *A47J 47/16* (2013.01); *A47J 43/10* (2013.01)

(58) Field of Classification Search
CPC ..... A47G 21/145; A47G 29/087; A47J 47/16; A47J 43/10; A47J 43/1006; A47J 43/125; A47J 43/284; A47J 2031/165; A47J 47/07; A47J 43/0711; A47J 42/00
USPC ................ 206/553, 207, 219, 220, 223, 349
See application file for complete search history.

(56) References Cited

U.S. PATENT DOCUMENTS

| | | | | |
|---|---|---|---|---|
| 4,972,955 A * | 11/1990 | Rymoen | ................ | A47L 15/502 206/553 |
| 5,732,616 A * | 3/1998 | Bryan | ................... | A47J 43/284 99/509 |
| 6,505,746 B1 * | 1/2003 | Johnson | ................... | A47J 47/16 248/37.3 |
| 7,861,883 B2 * | 1/2011 | Purushothaman | .... | A47L 15/502 206/553 |
| 8,047,373 B2 * | 11/2011 | Murphy | ................. | A47B 88/90 206/553 |
| 2005/0082307 A1 * | 4/2005 | Tucker | .................... | A47F 1/065 206/553 |
| 2007/0297274 A1 * | 12/2007 | Ondracek | ........... | A47J 43/1006 366/328.4 |
| 2011/0162986 A1 * | 7/2011 | Garman | .............. | A47J 43/0705 206/320 |
| 2013/0228480 A1 * | 9/2013 | Ketchum | ............... | B65D 51/32 206/219 |
| 2023/0380636 A1 * | 11/2023 | Warren, V | .............. | A47J 47/16 |

* cited by examiner

Primary Examiner — Rafael A Ortiz
(74) Attorney, Agent, or Firm — Daniel M. Cohn

(57) ABSTRACT

A stirring device is provided. The stirring device includes a stirring component and a base. the stirring component comprises a stirring portion and a holding portion, the stirring portion and the holding portion are connected to each other. The base defines an accommodating groove having an upper opening, at least one draining hole for communicating the accommodating groove with the outside is defined on a groove bottom wall of the accommodating groove, and the stirring portion is at least partially disposed in the accommodating groove. The stirring device that is capable of being properly placed and well protected.

17 Claims, 4 Drawing Sheets

STIRRING DEVICE

TECHNICAL FIELD

The present disclosure relates to a technical field of kitchenware equipment, and in particular to a stirring device.

BACKGROUND

Stirring devices are a common tool in a kitchen, each generally including a holding portion and a stirring head connected thereto, and when using the stirring devices, a user holds a corresponding holding portion to stir a target food using a corresponding stirring head.

However, there is no dedicated container for storing the stirring devices, making it difficult to properly place the stirring devices when the stirring devices are idle or needs to be placed aside during use, the stirring devices may suffer from accidental collisions or falls due to random placement when being idle, moreover, the stirring devices are prone to contamination by dust, bacteria, and other pollutants when being placed aside during use, thereby affecting hygiene conditions for the next use.

SUMMARY

Embodiments of the present disclosure provide a stirring device that is capable of being properly placed and well protected.

The embodiments of the present disclosure provide the stirring device, including a stirring component and a base. the stirring component comprises a stirring portion and a holding portion, the stirring portion and the holding portion are connected to each other. The base defines an accommodating groove having an upper opening, at least one draining hole for communicating the accommodating groove with the outside is defined on a groove bottom wall of the accommodating groove, and the stirring portion is at least partially disposed in the accommodating groove.

In some embodiments, the base includes a main body portion and a supporting portion, the supporting portion is connected to a periphery of the main body portion, the main body portion defines the accommodating groove, the at least one draining hole for communicating the accommodating groove with the outside is defined on a bottom wall of the main body portion, and the bottom wall of the main body portion is disposed above a bottom wall of the supporting portion in a vertical direction.

In some embodiments, a plurality of draining holes are provided, the plurality of the draining holes are arranged at intervals on the bottom wall of the main body portion.

In some embodiments, the at least one draining hole is strip-shaped.

In some embodiments, in a radial direction of the base, an aperture of each of a first part of the plurality of the draining holes is greater than an aperture of each of a second part of the plurality of the draining holes, where the first part of the plurality of the draining holes is located at a middle portion of the main body portion and the second part of the plurality of the draining holes is located at an edge portion of the main body portion.

In some embodiments, an anti-slip portion is disposed on a bottom portion of the supporting portion.

In some embodiments, when the base is placed on a placement surface, the supporting portion, the main body portion, and the placement surface enclose to form a cavity. At least one first groove is defined at the bottom portion of the supporting portion, the at least one first groove is communicated with the cavity, the at least one first groove allows air to pass through to enter the cavity, and the air flows upward through the at least one draining hole.

In some embodiments, a plurality of first grooves are provided, the plurality of the first grooves are arranged at intervals along a periphery of the supporting portion.

In some embodiments, a groove depth of the at least one first groove is less than a length of the at least one first groove.

In some embodiments, the stirring component includes a rod body connected to the holding portion, at least one second groove is defined on a top portion of the main body portion, when the stirring component is horizontally placed on the base, the rod body is at least partially disposed in the at least one second groove.

In some embodiments, a top portion of the supporting portion is connected to the top portion of the main body portion, the at least one second groove is defined at a connection of the main body portion and the supporting portion.

In some embodiments, in the vertical direction, the supporting portion is inclined downward away from the main body portion.

In some embodiments, the at least one second groove is arc-shaped; and/or, the at least one second groove includes two second grooves, the two second grooves are respectively disposed at two opposite sides of the main body portion.

In some embodiments, the stirring portion includes blades, the blades are connected to one end of the rod body away from the holding portion, and the blades are arranged at intervals in a circumferential direction of the rod body.

In some embodiments, an outer diameter of the rod body is decreased in a direction away from the holding portion, and ends of the blades away from the holding portion are connected to each other.

In some embodiments, in a radial direction of the stirring component, each of the blades is bent.

In some embodiments, a bottom portion of each of the blades includes a first blade portion, an outer side of each of the blades includes a second blade portion, each of a corresponding first blade portion and a corresponding second blade portion includes a first cutting surface and a second cutting surface. An outer end of a corresponding first cutting surface is connected to an outer end of a corresponding second cutting surface. A distance between the corresponding first cutting surface and the corresponding second cutting surface is increased in a direction close to the rod body.

In some embodiments, an included angle between the corresponding first cutting surface and the corresponding second cutting surface is $\alpha$, and the $\alpha$ satisfies a following relationship:

$$30° \leq \alpha \leq 60°.$$

In some embodiments, a rounded corner is disposed at a connection between the corresponding first blade portion and the corresponding second blade portion; and/or, in an extending direction of the corresponding first cutting surface, a length of the corresponding first cutting surface is not less than 3 mm and is not greater than 8 mm; and/or, in an extending direction of the corresponding second cutting surface, a length of the corresponding second cutting surface is not less than 3 mm and is not greater than 8 mm.

In some embodiments, a material of the stirring component comprises any one of polypropylene (PP), polycarbonate (PC), and acrylonitrile butadiene styrene (ABS), and a material of the base comprises any one of the PP, the PC, and the ABS.

According to the stirring device of the embodiments of the present disclosure, the stirring device includes the stirring portion and the holding portion connected thereto, the holding portion allows a user to hold by hands, while the stirring portion enables the user to operate the stirring device to stir a target food. The base defines the accommodating groove having the upper opening, when the stirring component is not in use, the stirring component is at least partially disposed in the accommodating groove, which is convenient for fixing or storing.

The at least one draining hole for communicating the accommodating groove with the outside is defined on the groove bottom wall of the accommodating groove, after the stirring component is cleaned or when the stirring component needs to be placed aside during use, the accommodating groove provides a stable placement space for the stirring component and further prevents the stirring component from rolling on the placement surface, sliding off, or contaminating other objects. When the stirring component is disposed in the accommodating groove, if there is residual water on the stirring component, the residual water may naturally drain out through the at least one draining hole, thereby avoiding bacteria breeding and peculiar smell problems caused by accumulation of water, in this way, cleaning and drying efficiency is further improved.

BRIEF DESCRIPTION OF DRAWINGS

In order to more clearly illustrate embodiments of the present disclosure or technical solutions in the prior art, accompanying drawings required in description of the embodiments or the prior art are briefly described below, and obviously, the accompanying drawings in the following description are merely some embodiments of the present disclosure, and for those who skilled in the art, other drawings may be obtained according to structures shown in these drawings without creative efforts.

Figure 1:
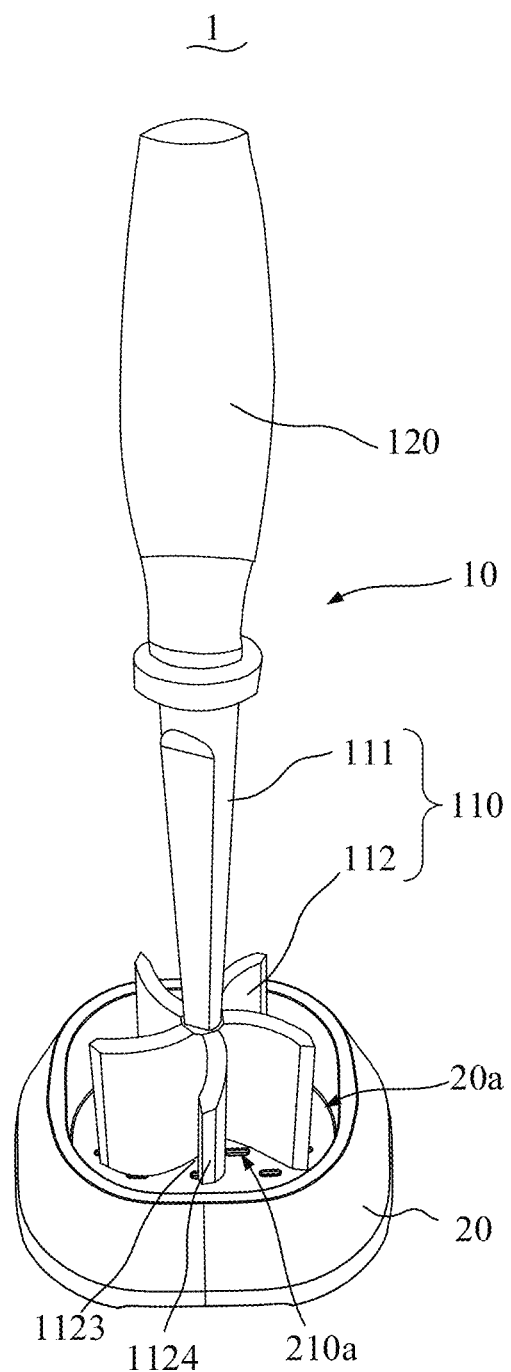
FIG. 1 is a structural schematic diagram of a stirring device according to one embodiment of the present disclosure.

Reference numerals in the drawings: 1. stirring device; 10. stirring component; 110. stirring portion; 111. rod body; 112. blade; 1121. first blade portion; 1122. second blade portion; 1123. first cutting surface; 1124. second cutting surface; 1125. rounded corner; 120. holding portion; 20. base; 20a. accommodating groove; 20b. second groove; 210. main body portion; 210a. draining hole; 220. supporting portion; 220a. first groove; 230. anti-slip portion.

Implementations, functional features, and advantages of the present disclosure are further described with reference to the accompanying drawings in combination with the embodiments.

DETAILED DESCRIPTION OF EMBODIMENTS

In order to better understand technical solutions of the present disclosure, embodiments of the present disclosure are described in detail below with reference to accompanying drawings.

When following description refers to the accompanying drawings, unless otherwise indicated, the same numbers in different drawings represent the same or similar elements. Implementations described in following exemplary embodiments do not represent all implementations consistent with this application. Instead, they are merely examples of apparatuses and methods consistent with some aspects of the present disclosure as recited in appended claims.

In the description of the present disclosure, it should be understood that terms "first", "second", etc. are only used for descriptive purposes, and cannot be understood as indicating or implying relative importance. Those who skilled in the art would understand specific meanings of the foregoing terms in the present disclosure according to specific situations. In addition, in the description of the present disclosure, unless otherwise stated, "a plurality of" means two or more, "and/or" used herein is merely an association relationship describing associated objects. For example, A and/or B may indicate three cases that A exists alone, A and B exist, and B exists alone, and a character "/" in the specification generally indicates an "or" relationship between the associated objects Unless otherwise defined, all technical and scientific terms used herein have the same meaning as commonly understood by those who skilled in the art to which the present disclosure belongs. The terms used in the specification are only for the purpose of describing specific embodiments, and are not intended to limit the present disclosure. As used herein, the term "and/or" includes any and all combinations of one or more of associated listed items.

Please refer to FIG. 1, embodiments of the present disclosure provide a stirring device 1, including a stirring component 10 and a base 20. The stirring device 1 includes a stirring portion 110 and a holding portion 120 connected thereto, the holding portion 120 allows a user to hold by hands, while the stirring portion 110 enables the user to operate the stirring device 1 to stir a target food. The base 20 defines an accommodating groove 20a having an upper opening, when the stirring component 10 is not in use, the stirring component 10 is at least partially disposed in the accommodating groove 20a, which is convenient for fixing or storing. Specifically, at least one draining hole 210a for communicating the accommodating groove 20a with the outside is defined on a groove bottom wall of the accommodating groove 20a. After the stirring component 10 is cleaned or when the stirring component 10 needs to be placed aside during use, the accommodating groove 20a provides a stable placement space for the stirring component 10 and further prevents the stirring component 10 from rolling on a placement surface, sliding off, or contaminating other objects. When the stirring component 10 is disposed in the accommodating groove 20a, if there is residual water on the stirring component 10, the residual water may naturally drain out through the at least one draining hole 210a, thereby avoiding bacteria breeding and peculiar smell problems caused by accumulation of water, in this way, cleaning and drying efficiency is further improved.

As mentioned above, the stirring portion 110 is in direct contact with the target food and is configured to stir the target food, and a material, a shape, and a design of the stirring portion 110 is determined according to specific stirring requirements. In some embodiments, please refer to FIG. 1, the stirring component 10 includes a rod body 111 and blades 112, the blades 112 are connected to a first end of the rod body 111, and the holding portion 120 is connected to a second end of the rod body 111. In some embodiments, two, three, four, five, or more blades 112 are provided according to the specific stirring requirements. For example, the five blades 112 are provided in the embodiments of the present disclosure, the five blades 112 is configured to increase a coverage area of stirring and enhance stirring strength, so that the target food is uniformly stirred. The blades 112 are selected from straight blades, sawtooth blades, spiral blades, etc. The blades 112 are arranged in a parallel manner, a staggered manner, or a spiral manner. The rod body 111 is generally elongated, a diameter and a length of which are determined by those who skilled in the art according to the specific stirring requirements and usage scenarios. For example, the rod body 111 is designed as a straight rod or a container with a certain degree of curvature to adapt to different shapes and depths.

For example, in the embodiments of the present disclosure, the rod body 111 is designed as the straight rod, in a radial direction of the stirring component 10, each of the blades 112 is bent, and the blades 112 are arranged at intervals in a circumferential direction of the rod body 111, the stirring component 10 in the embodiments of the present disclosure are capable of stirring food materials, such as meat, fruits, etc. It can be understood that the rod body 111 and the blades 112 in the embodiments of the present disclosure are made of the same material, and may also be made of different materials, for example, the rod body 111 and the blades 112 are all made of hard plastic that is selected from, but not limited to, polypropylene (PP), polycarbonate (PC), and acrylonitrile butadiene styrene (ABS). In this way, the stirring portion 110 is integrally formed through injection molding, further enabling high production efficiency, and the hard plastic has high hardness, so that the stirring portion 10 is capable of resisting certain impact and wear in a stirring process, a service life of the stirring portion 10 is further prolonged, and for food with toughness, such as meat and fruits including apples, pears, etc., the stirring portion 10 made of the hard plastic also provides enough stirring force to ensure uniform stirring on the target food. In addition, the stirring portion 10 made of the hard plastic is lighter, which is more labor-saving for a user to handle and is also convenient for storage and carriage. Certainly, in other embodiments, the rod body 111 and the blades 112 are made of other metal materials, such as stainless steel and aluminum alloy.

It may be understood that, in some other embodiments, the stirring portion 110 and the holding portion 120 are made of the same material, and may also be made of different materials. In the present disclosure, the stirring component 10 is integrally formed by injection molding a hard material, in this way, integrity of the stirring component 10 is improved, a surface of the stirring component 10 is smooth and flat, dirt is not prone to hiding, which is convenient for the user to clean and maintain, and production efficiency of the stirring component 10 is further improved. Certainly, in some embodiments, the stirring portion 110 and the holding portion 120 are separated, the stirring portion 110 and the holding portion 120 are separately manufactured, and then the stirring portion 110 and the holding portion 120 are fixed into a whole through welding, threaded connection, snap-fit, etc. An anti-slip pattern is disposed on a surface of the holding portion 120 to prevent the holding portion 120 from sliding off during use, and the holding portion 120 is of an irregular rod structure being larger in middle and smaller at ends, such a structure conforms to principles of ergonomics and better adapts to holding habits of human hands.

Figure 2:
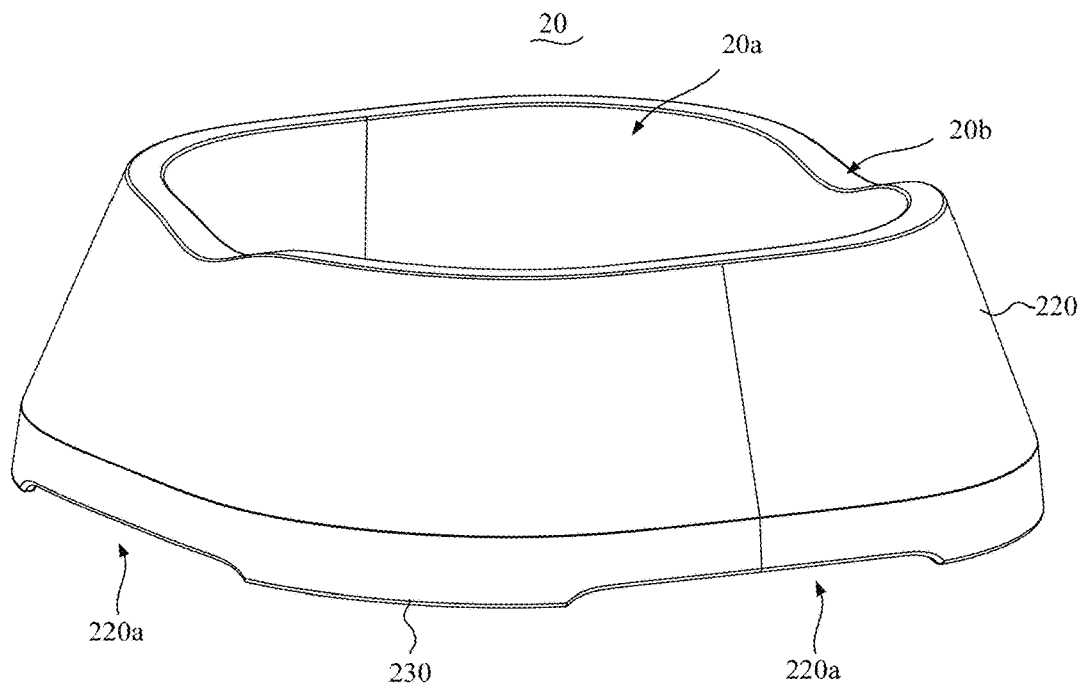
FIG. 2 is a structural schematic diagram of a base according to one embodiment of the present disclosure.
Figure 3:
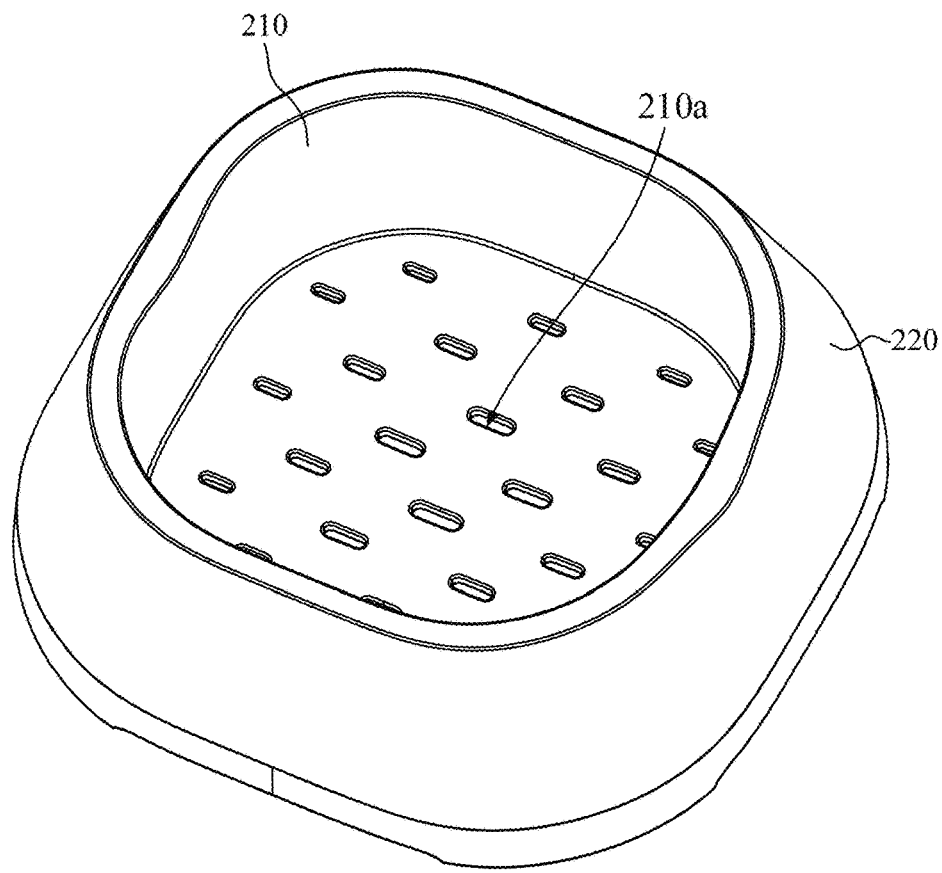
FIG. 3 is a cross-sectional schematic diagram of the base according to one embodiment of the present disclosure.
Figure 4:
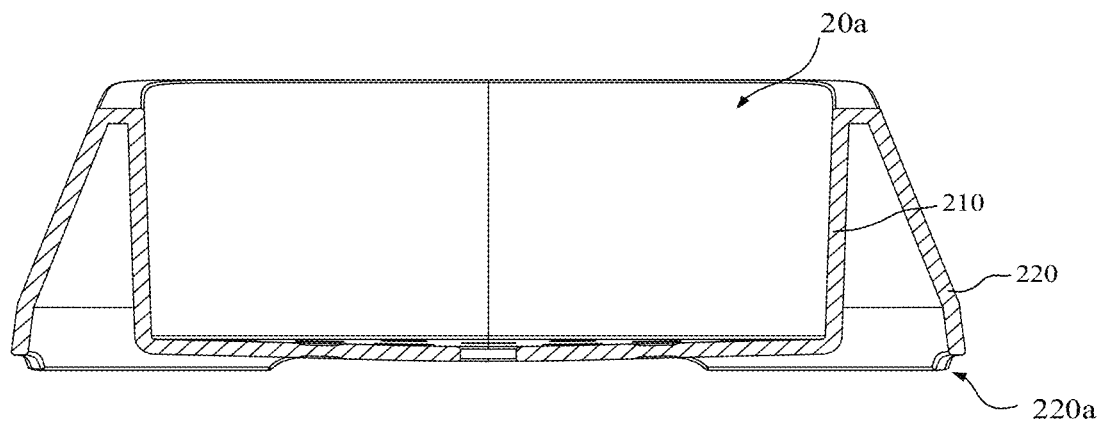
FIG. 4 is another cross-sectional schematic diagram of the base according to one embodiment of the present disclosure.

Please further refer to FIGS. 2-4, the base 20 includes a main body portion 210 and a supporting portion 220, the main body portion 210 defines the accommodating groove 20a, the at least one draining hole 210a for communicating the accommodating groove 20a with the outside is defined on a bottom wall of the main body portion 210, and the bottom wall of the main body portion 210 is disposed above a bottom wall of the supporting portion 220 in a vertical direction, in this way, the residual water is smoothly drain out through the at least one draining hole 210a, thereby being prevented from accumulating inside the main body portion 210. In some embodiments, a plurality of draining holes 210a are provided, the plurality of the draining holes 210a are arranged at intervals on the bottom wall of the main body portion 210, so that residual water in an entire area of the accommodating groove 20a is effectively drain out, and a situation that one part dries while another remains wet is avoided. The at least one draining hole 210a is strip-shaped, and a strip-shaped hole has a larger drainage area than a circular hole, so that the residual water is guided to more quickly flow out through the at least one draining hole 210a, and draining time is further reduced. In addition, a design of the strip-shaped hole is also coordinated with an overall appearance of the base 20 to improve esthetics appeal of the stirring device 1.

It should be noted that, in some embodiments, the base 20 is made of the hard plastic, for example, but not limited to, the PP, the PC, the ABS, etc., so that the base 20 is capable of being integrally formed by injection molding, thereby improving production efficiency thereof.

In some embodiments, please refer to FIG. 3, in a radial direction of the base 20, an aperture of each of a first part of the plurality of the draining holes 210a is greater than an aperture of each of a second part of the plurality of the draining holes 210a, where the first part of the plurality of the draining holes 210a is located at a middle portion of the main body portion 210 and the second part of the plurality of the draining holes 210a is located at an edge portion of the main body portion 210. It may be understood that the middle portion of the main body portion 210 is generally closer to the stirring component 10, and therefore, the middle portion of the main body portion 210 is also an area with more water accumulation, and a water flow rate of such area is accelerated by increasing the aperture of each of the first part of the plurality of the draining holes 210a, so that the residual water is more quickly drain out, thereby improving overall draining efficiency. In addition, the aperture of each of the second part of the plurality of the draining holes 210a at the edge portion of the main body portion 210a is configured to be smaller, which is capable of slowing down a water flow rate at the edge portion of the main body portion 210a, thereby preventing the residual water from splashing outward.

In order to prevent the base 20 from sliding or shifting on a smooth or inclined surface, an anti-slip portion 230 is disposed on a bottom portion of the supporting portion 220. The anti-slip portion 230 is a layer of rubber or a silica gel pad adhered or injection molded to the bottom portion of the supporting portion 220, or an anti-slip pattern at the bottom portion of the supporting portion 220, or a suction cup mounted at the bottom portion of the supporting portion 220. In foregoing manners, friction between the base 20 and the placement surface is effectively increased to prevent sliding.

In some embodiments, please refer to FIG. 4, when the base 20 is placed on a placement surface, such as a desktop or a kitchen countertop, the supporting portion 220, the main body portion 210, and the placement surface enclose to form a cavity. At least one first groove 220a is defined at the bottom portion of the supporting portion 220, the at least one first groove 220a is communicated with the cavity, the at least one first groove 220a allows air to pass through to enter the cavity, and the air flows upward through the at least one draining hole 210a, part of moisture and bacteria is taken away while the air flows, so that drying and cleaning inside the base 20 are kept, thereby reducing water accumulation and bacteria breeding inside the base 20.

Optionally, a plurality of first grooves 220a are provided, the plurality of the first grooves 220a are arranged at intervals along a periphery of the supporting portion 220. The plurality of the first grooves 220a significantly increase a number of channels allowing the air to enter the cavity, thereby enhancing circulation of the air inside the base 20. When the supporting portion 220 bears a weight of the base 20 with objects placed thereabove, the bottom portion of the supporting portion 220 is subjected to pressure. By arranging the plurality of the first grooves 220a at intervals, the pressure is more uniformly distributed at the bottom portion of the supporting portion 220, so that a situation of excessive local pressure is reduced, and bearing capacity and stability of the base 20 are improved.

Optionally, a groove depth of the at least one first groove 220a is less than a length of the at least one first groove 220a. A shallow groove depth may reduce an amount of material removal at the bottom portion of the supporting portion 220, thereby maintaining strength of the supporting portion 220 in the vertical direction, which is important for overall stability of the base 20, the supporting portion 220 is not prone to deformation or inclination when bearing the weight of the base 20 with the objects placed thereabove. Although the groove depth of the at least one first groove 220a is shallow, the length of the at least one first groove 220a is relatively long, the air is still able to effectively enter the cavity. After the air enters the cavity through the at least one first groove 220a, the air flows along a length direction of the at least one first groove 220a and flows upward through the at least one draining hole 210a to achieve a good ventilation and draining effect.

In some embodiments, please refer to FIG. 2, at least one second groove 20b is defined on a top portion of the main body portion 210, when the stirring component 10 is horizontally placed on the base 20, the rod body 111 is at least partially disposed in the at least one second groove 20b. The stirring component 10 of the present disclosure may be vertically placed in the accommodating groove 20a, or may be horizontally placed in the accommodating groove 20a, which is convenient for the user to adjust according to a space of a kitchen. When the stirring component 10 is horizontally placed, the rod body 111 is partially disposed in the at least one second groove 20b, so that sliding or rolling of the stirring component 10 on the base 20 is effectively reduced, thereby improving stability of the stirring component 10.

In some embodiments, an outer diameter of the rod body 111 is decreased in a direction away from the holding portion 120, and ends of the blades 112 away from the holding portion 120 are connected to each other, in this way, efficiency of cutting and stirring the target food by the blades is improved.

Optionally, the at least one second groove 20b is arc-shaped. An arc-shaped groove better adapts to a shape of the rod body 111 of the stirring component 10, especially when the stirring component 10 is horizontally placed on the base 20, the arc-shaped groove more tightly envelops a part of the rod body 111, thereby improving the stability of the stirring component 10. In addition, the arc-shaped groove also has esthetic appeal, thereby providing a sense of streamline and dynamism to the base 20.

Optionally, the at least one second groove 20b includes two second grooves 20b, the two second grooves 20b are respectively disposed at two opposite sides of the main body portion 210. In this way, the user may place the rod body 111 of the stirring component 10 in one of the two second grooves 20b on any side of the main body portion 210 as required, thereby improving convenience of placing the stirring component 10. At the same time, symmetrical distribution of the two second grooves 20b also enables the base 20 to look more balanced and harmonious.

In some embodiments, atop portion of the supporting portion 220 is connected to the top portion of the main body portion 210, the at least one second groove 20b is defined at a connection of the main body portion 210 and the supporting portion 220. It may be understood that the connection of the supporting portion 220 and the main body portion 210 may have a relatively high structural strength, and the second at least one groove 20b is defined at the connection of the supporting portion 220 and the main body portion 210, which improves stability of limiting the stirring component 10 by the at least one second groove 20b, moreover, a groove wall of the at least one second groove 20b is configured to be larger, thereby further improving stability of horizontally placing stirring component 10.

In the vertical direction, the supporting portion 220 is inclined downward away from the main body portion 210. Inclining the supporting portion 220 provides a more stable supporting surface, especially when the stirring component 10 or other objects are placed on the base 20. Such inclined design helps to disperse a weight and reduce an overturning risk of the base 20 caused by concentrated force. In addition, when the stirring component 10 is horizontally placed, a gravity line of the stirring component 10 forms a stable supporting angle with an inclined surface of the supporting portion 220, thereby further improving stability of placement.

Figure 5:
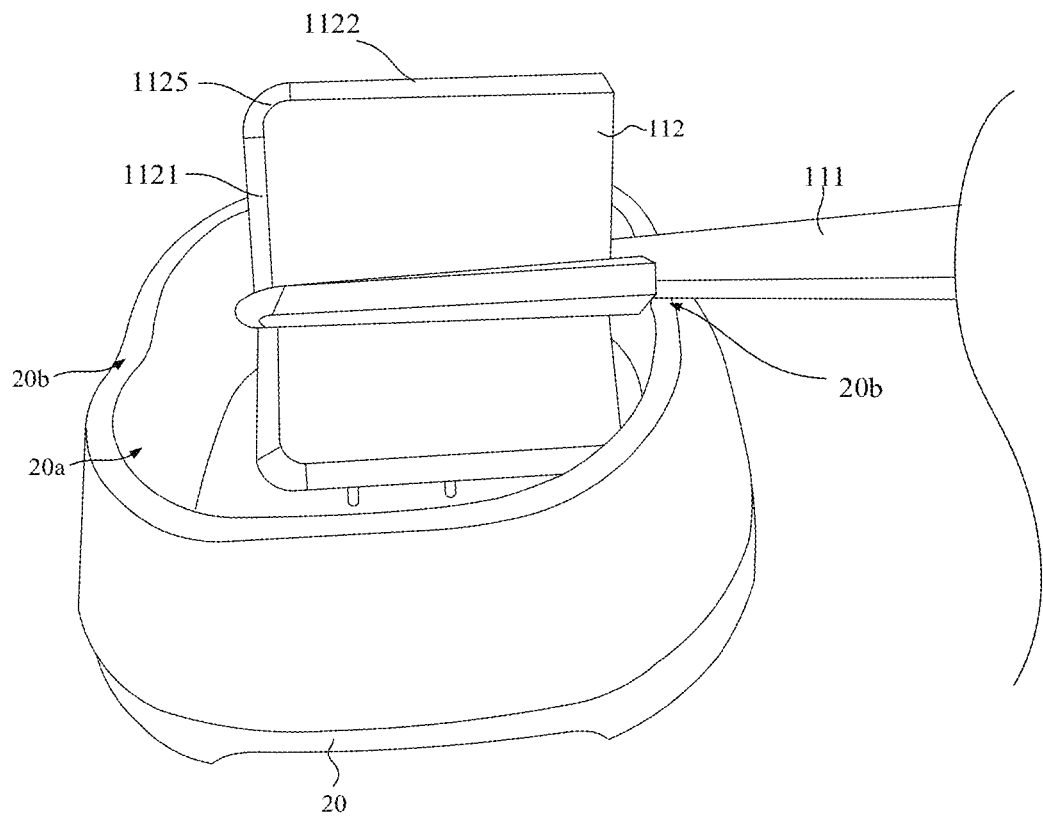
FIG. 5 is a structural schematic diagram of a stirring component being horizontally placed on the base.

In some embodiments, please further refer to FIG. 5, a bottom portion of each of the blades 112 includes a first blade portion 1121, an outer side of each of the blades 112 includes a second blade portion 1122, each of a corresponding first blade portion 1121 and a corresponding second blade portion 1122 includes a first cutting surface 1123 and a second cutting surface 1124. An outer end of a corresponding first cutting surface 1123 is connected to an outer end of a corresponding second cutting surface 1124. A distance between the corresponding first cutting surface 1123 and the corresponding second cutting surface 1124 is increased in a direction close to the rod body 111. In other words, an outer end portion of the corresponding first blade portion 1121 and an outer end portion of the corresponding second blade portion 1122 are more pointed. When the corresponding first blade portion 1121 and the corresponding second blade portion 1122 are in contact with the target food, a greater force is concentrated on a smaller contact area. As a result, the target food is torn and cut along the first cutting surface 1123 and the second cutting surface to achieve a desired stirring effect.

Figure 6:
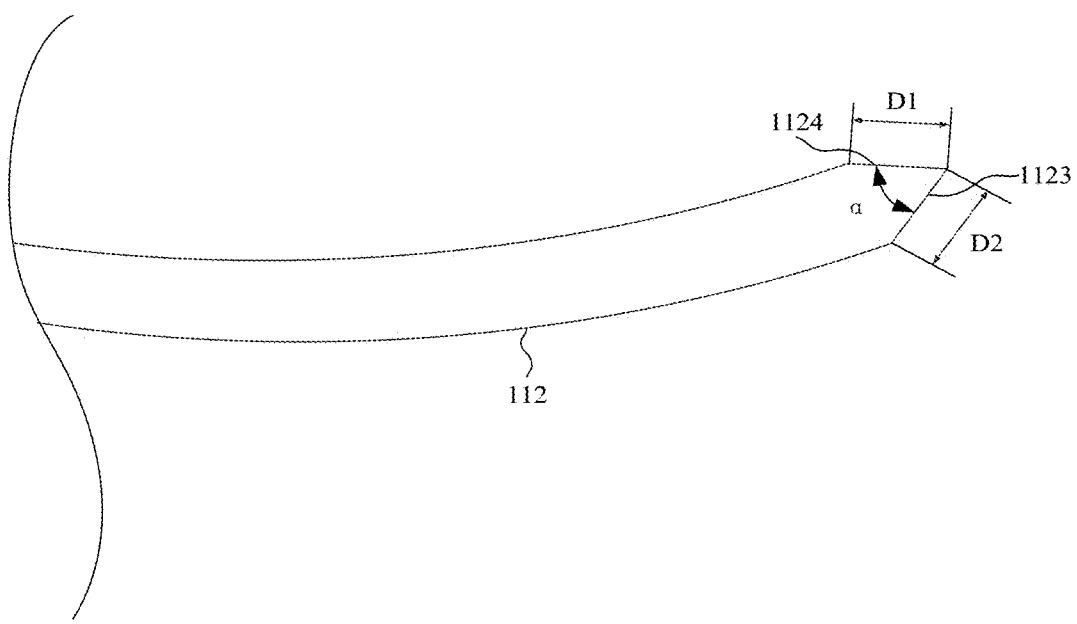
FIG. 6 is a structural schematic diagram of a blade according to one embodiment of the present disclosure.

In some embodiments, please refer to FIG. 6, an included angle between the corresponding first cutting surface 1123 and the corresponding second cutting surface 1124 is α, and the α satisfies a following relationship:

$$30°\leq \alpha \leq 60°.$$

It may be understood that if the included angle is too small, a thickness of each of the blades 112 is relatively thin, so that the blades 112 are easy to bend or damage during use, especially when processing a hard or highly viscous food; if the included angle is too large, although strength of the blades 112 is increased, energy consumption and resistance in the stirring process are increased. Therefore, the included angle α between the first cutting surface 1123 and the second cutting surface 1124 is not less than 30° and is not greater than 60°, so as to ensure that the blades 112 have sufficient strength and durability and further that cutting resistance of the blades 112 is not too large.

In some embodiments, please refer to FIG. 6, in an extending direction of the corresponding first cutting surface 1123, a length of the corresponding first cutting surface 1123 is not less than 3 mm and is not greater than 8 mm; and, in an extending direction of the corresponding second cutting surface 1124, a length of the corresponding second cutting surface 1124 is not less than 3 mm and is not greater than 8 mm. The length of the corresponding first cutting surface 1123 and the length of the corresponding second cutting surface 1124 directly affect cutting efficiency. An excessively short cutting surface cannot provide a sufficient cutting area, resulting in a limited cutting speed; and an excessively long cutting surface may increase resistance and wear in a cutting process, which is also not beneficial to improvement of the cutting efficiency. The length of the corresponding first cutting surface 1123 and the length of the corresponding second cutting surface 1124 each is set between 3 mm and 8 mm, so that the corresponding first cutting surface 1123 and the corresponding second cutting surface 1124 not only provides sufficient cutting area, but also maintain a higher cutting speed.

In some embodiments, a rounded corner 1125 is disposed at a connection between the corresponding first blade portion 1121 and the corresponding second blade portion 1122. In this way, the target food is initially cut by the corresponding first blade portion 1121, and then, guided by the rounded corner 1125, the target food is smoothly cut by the corresponding second blade portion 1122. The rounded corner 1125 is configured to reduce resistance during the cutting process. When the blades 112 work, especially when the blades 112 need to turn or change a cutting direction, the connection between the corresponding first blade portion 1121 and the corresponding second blade portion 1122 is easy to become a point of stress concentration, and the rounded corner 1125 provides a smooth transition in the connection between the corresponding first blade portion 1121 and the corresponding second blade portion 1122, thereby reducing friction and resistance during the cutting process, so that the cutting process is smoother.

Same or similar reference numerals in the drawings of the embodiments of the present disclosure correspond to the same or similar components. In the description of the present disclosure, it should be understood that orientations or working position relationships indicated by terms "upper", "lower", "left", "right", etc. are only for ease of description of the present disclosure and simplified description, rather than indicating or implying that the referred device or element must have a specific orientation, and is constructed and operated in a specific orientation, so the terms describing the working position relationships in the accompanying drawings are only used for exemplary description and cannot be understood as a limitation to the present disclosure, and for those who skilled in the art, specific meanings of above terms may be understood according to specific situations.

The above are only preferred embodiments of the present disclosure and are not intended to limit the present disclosure, and any modification, equivalent replacement and improvement made within a spirit and a principle of the present disclosure shall fall within a protection scope of the present disclosure.

What is claimed is:

1. A stirring device, comprising:
a stirring component; and
a base;
wherein the stirring component comprises a stirring portion and a holding portion, the stirring portion and the holding portion are connected to each other;
the base defines an accommodating groove having an upper opening, at least one draining hole for communicating the accommodating groove with the outside is defined on a groove bottom wall of the accommodating groove, and the stirring portion is at least partially disposed in the accommodating groove;
the base comprises a main body portion and a supporting portion, the supporting portion is connected to a periphery of the main body portion, the main body portion defines the accommodating groove, the at least one draining hole for communicating the accommodating groove with the outside is defined on a bottom wall of the main body portion;
when the base is placed on a placement surface, the supporting portion, the main body portion, and the placement surface enclose to form a cavity; and
a plurality of first grooves are defined at the bottom portion of the supporting portion, the plurality of the first grooves are communicated with the cavity, the plurality of the first grooves allow air to pass through to enter the cavity, and the air flows upward through the at least one draining hole; the plurality of the first grooves are arranged at intervals along a periphery of the supporting portion.

2. The stirring device according to claim 1, wherein the at least one draining hole comprises a plurality of draining holes, the plurality of the draining holes are arranged at intervals on the bottom wall of the main body portion.

3. The stirring device according to claim 1, wherein the at least one draining hole is strip-shaped.

4. The stirring device according to claim 2, wherein in a radial direction of the base, an aperture of each of a first part of the plurality of the draining holes is greater than an aperture of each of a second part of the plurality of the draining holes, wherein the first part of the plurality of the draining holes is located at a middle portion of the main body portion and the second part of the plurality of the draining holes is located at an edge portion of the main body portion.

5. The stirring device according to claim 1, wherein an anti-slip portion is disposed on a bottom portion of the supporting portion.

6. The stirring device according to claim 1, wherein a groove depth of each of the first grooves is less than a length of each of the first grooves.

7. The stirring device according to claim 1, wherein the stirring component comprises a rod body connected to the holding portion, at least one second groove is defined on a top portion of the main body portion, when the stirring component is horizontally placed on the base, the rod body is at least partially disposed in the at least one second groove.

8. The stirring device according to claim 7, wherein a top portion of the supporting portion is connected to the top portion of the main body portion, the at least one second groove is defined at a connection of the main body portion and the supporting portion.

9. The stirring device according to claim 8, wherein in a vertical direction, the supporting portion is inclined downward away from the main body portion.

10. The stirring device according to 7, wherein the at least one second groove is arc-shaped; and/or
   the at least one second groove comprises two second grooves, the two second grooves are respectively disposed at two opposite sides of the main body portion.

11. The stirring device according to claim 7, wherein the stirring portion comprises blades, the blades are connected to one end of the rod body away from the holding portion, and the blades are arranged at intervals in a circumferential direction of the rod body.

12. The stirring device according to claim 11, wherein an outer diameter of the rod body is decreased in a direction away from the holding portion, and ends of the blades away from the holding portion are connected to each other.

13. The stirring device according to claim 11, wherein in a radial direction of the stirring component, each of the blades is bent.

14. The stirring device according to claim 11, wherein a bottom portion of each of the blades comprises a first blade portion, an outer side of each of the blades comprises a second blade portion, each of a corresponding first blade portion and a corresponding second blade portion comprises a first cutting surface and a second cutting surface;
   an outer end of a corresponding first cutting surface is connected to an outer end of a corresponding second cutting surface; and
   a distance between the corresponding first cutting surface and the corresponding second cutting surface is increased in a direction close to the rod body.

15. The stirring device according to claim 14, wherein an included angle between the corresponding first cutting surface and the corresponding second cutting surface is $\alpha$, and the $\alpha$ satisfies a following relationship:

$$30°\leq\alpha\geq60°.$$

16. The stirring device according to claim 14, wherein a rounded corner is disposed at a connection between the corresponding first blade portion and the corresponding second blade portion; and/or
   in an extending direction of the corresponding first cutting surface, a length of the corresponding first cutting surface is not less than 3 mm and is not greater than 8 mm; and/or
   in an extending direction of the corresponding second cutting surface, a length of the corresponding second cutting surface is not less than 3 mm and is not greater than 8 mm.

17. The stirring device according to claim 13, wherein a material of the stirring component comprises any one of polypropylene (PP), polycarbonate (PC), and acrylonitrile butadiene styrene (ABS); and
   a material of the base comprises any one of the PP, the PC, and the ABS.

* * * * *